United States Patent [19]

Batson

[11] Patent Number: 4,782,790
[45] Date of Patent: Nov. 8, 1988

[54] AUTOMATIC DOG FEEDER

[76] Inventor: Dalton B. Batson, 11141 NW. 39th St., Coral Springs, Fla. 33065

[21] Appl. No.: 71,207

[22] Filed: Jul. 8, 1987

[51] Int. Cl.$^4$ .............................................. A01K 5/00
[52] U.S. Cl. ........................... 119/51.11; 119/52 B; 119/56 R
[58] Field of Search ................. 119/51.12, 51.11, 51.5, 119/52 B, 56 R

[56] References Cited

U.S. PATENT DOCUMENTS

| 378,909 | 3/1888 | Dodd et al. | 119/56 R |
|---|---|---|---|
| 867,221 | 9/1907 | Croshier | 119/56 R |
| 3,171,385 | 3/1965 | Decker et al. | 119/51.11 |
| 3,669,076 | 6/1972 | Ellis | 119/52 B |
| 3,727,584 | 4/1973 | Permann | 119/56 R |

Primary Examiner—Robert Peshock
Attorney, Agent, or Firm—Alvin S. Blum

[57] ABSTRACT

An automatic dog feeding machine stores a clean and dry supply of dog food. It dispenses measured amounts into a feeding dish at predetermined intervals. It also provides water. The dispensing mechanism includes a hopper with a gated side aperture and an endless conveyor belt below the hopper. Dry food rests on the conveyor belt while within the hopper, the gate opens for a predetermined interval, and the belt carries the food through the aperture to drop down into a chute and thence into a food dish accessible to the animal. The belt runs long enough after the gate closes to dispense all the food on the belt outside the hopper so that all the food remaining inside the machine is maintained within the hopper in protected condition.

12 Claims, 4 Drawing Sheets

AUTOMATIC DOG FEEDER

This invention relates to automatic animal feeding systems and, more particularly, to a machine for automatically dispensing measured amounts of food and water to an unattended dog for sustenance over a prolonged period of time.

Automatic feeding systems include the following U.S. Pat. Nos.: 3,302,617; 3,428,027; 3,556,057; 3,581,711; 4,131,082; 4,741,163; 3,754,528; 3,793,990; 3,171,385 and 3,132,738. These inventions do not address certain special requirements of an automatic dog feeder that the instant invention has been designed to meet.

When a dog is unattended for many days, measured amounts of food for each meal must be dispensed, and the animal must be restrained from the reserve food supply. Otherwise, he will overeat, harming himself and depleting food reserves. Many dry food mixtures are available that keep well at room temperature, but they must be kept dry until dispensed to prevent spoilage. Furthermore, the stored food must be kept free of vermin.

Since most dog owners cannot justify the purchase and storage of a dog feeder for the limited use it will get, a machine that can be rented to many dog owners is a more commercially viable design. Such a machine should be readily transported, easily decontaminated to prevent disease transmission and easily maintained and adjusted to each dog's individual requirement.

SUMMARY OF THE INVENTION

It is, accordingly, an object of the invention to provide an automatic dog feeding machine that can be easily moved, but resists the attack of a large dog seeking the food reserves. It is a further object to provide a dog feeding machine that dispenses an adjustable portion of dog food to a dog while maintaining the food reserves clean, dry and vermin free. It is yet another object to dispense water automatically.

The feeder employs an endless belt to drop food down a chute into the dog feeding dish. A food hopper above the belt holds the store of food and a gate at the hopper prevents the belt from removing food from the hopper. The belt and the gate move under the control of timers. The gate opens and the belt rotates at the start of a dispense cycle. Food falls by gravity from the hopper onto the upper surface of the moving belt which carries the food to the point where the belt returns. At this point the food drops into the chute, and thereby into the dog's feeding dish. After an adjustable time interval, the gate closes, and no more food is released to the belt. The belt continues to move for a time period after the gate closes that is long enough to ensure that the food left on the belt after the gate closes has all dropped through the chute. All the food reserves are enclosed in the hopper and the belt is empty of food until the next feeding cycle. Solenoid controlled water valves dispense water into the feed dish and into a water dish. A drying means keeps the reserve dood dry. The moving mechanisms contacting the food are removable in module form for decontamination. The electrical parts are also removable as a unit for maintenance. Stabilizing weights in the base are removable for transporting the device.

These and other objects, features, and advantages of the invention will become more fully apparent when the following detailed descriptions of preferred embodiments of the invention are read in conjunction with the accompanying drawings, wherein.

DETAILED DESCRIPTION OF THE PREFERRED EMBODIMENT

Figure 1:
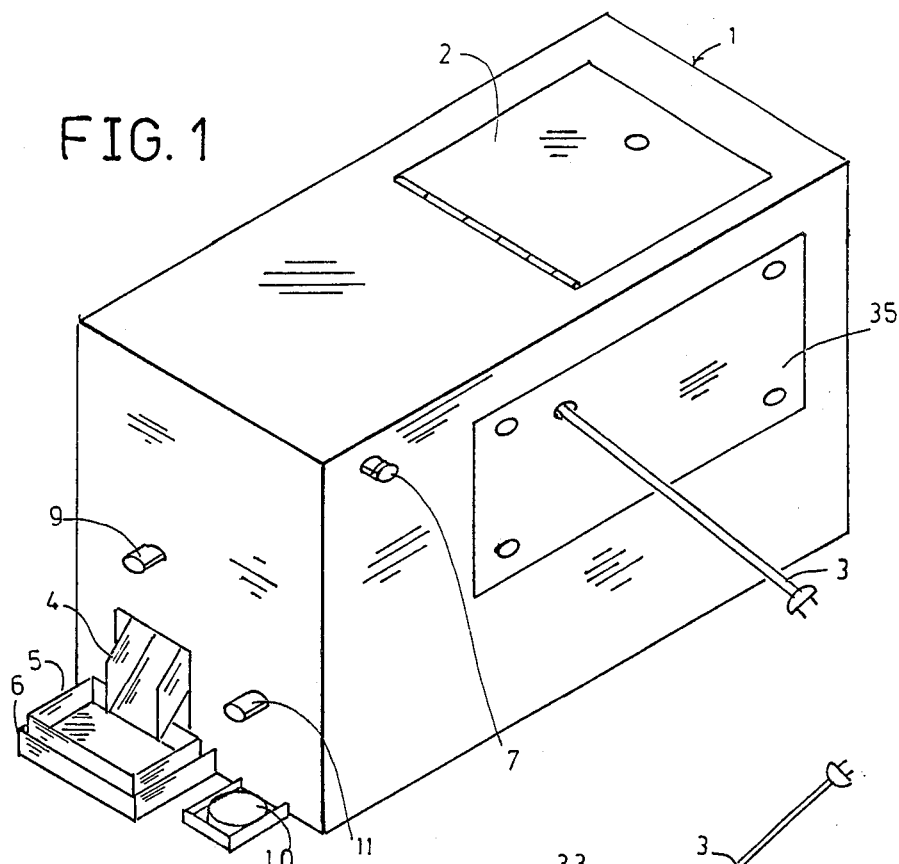
FIG. 1 is a perspective view of the invention.

Referring first to FIG. 1, wherein the automatic dog feeding machine 1 is shown, dry dog food is loaded into a hopper inside the machine through access door 2. The unit is powered by electric line cord 3. A metered food ration drops through chute 4 into food dish 5, held in food dish holder 6. A fresh water supply hose is connected to hose connector 7. Water is metered into food dish 5 via water outlet 9 and into water dish 10 via outlet 11.

Referring now to FIGS. 2,3,4,9 and 10, a food hopper 12 is covered by cover 13 carrying a renewable drying agent 14 on its underside. The cover protects the food from vermin and the drying agent keeps the food dry so that it will not spoil and also to ensure its free flowing action in dripping down the hopper and into the moving endless conveyor belt 15 in the food metering operation. Belt 15 is molded on an elastomeric material that is easily cleaned between uses, as exemplified by polyurethane. Its outer surface has lateral ridges 44 to retain food. Its inner surface has molded-in projections 16 that engage grooves 17 in driving pinion gear 19 and idler pinion gear 20 to provide precise linear displacement of the belt in the food metering operation. Food gate 21 riding in gate guides 22 fixed on food hopper 12 has a precise reciprocating motion, down, as in FIGS. 3 and 9, for retaining the food in the hopper and up, as in FIGS. 2 and 10. When gate 21 is in the up position, the side opening 23 in hopper 12 is exposed. The belt 15 rotates while gate 21 is up, so that food in the hopper that is resting on the belt is carried out of the side opening 23 and the quantity of food carried out by the belt is replenished by gravity flow of food above it in the hopper. The belt moves at a precise speed, thereby removing a precise quantity of food from the hopper in a unit of time. At a precise time when the requisite amount of food has been removed from the hopper, gate 21 is moved to the down position, thereby blocking the further removal of food by belt 15. Belt 15 continues to move for a fixed time interval after gate 21 has closed. This causes all food on the belt past gate 21 to drop into chute 4 and thence into food dish 5 that is securely held in food dish holder 6.

Figure 8:
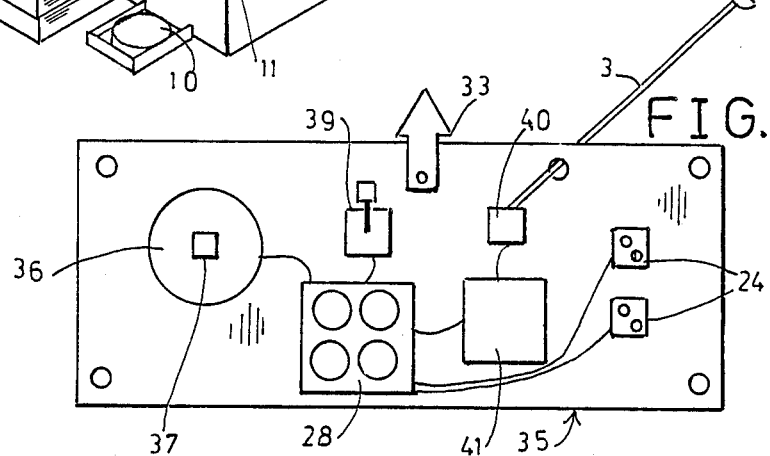
FIG. 8 is a side elevation view of the electrical module.
Figure 2:
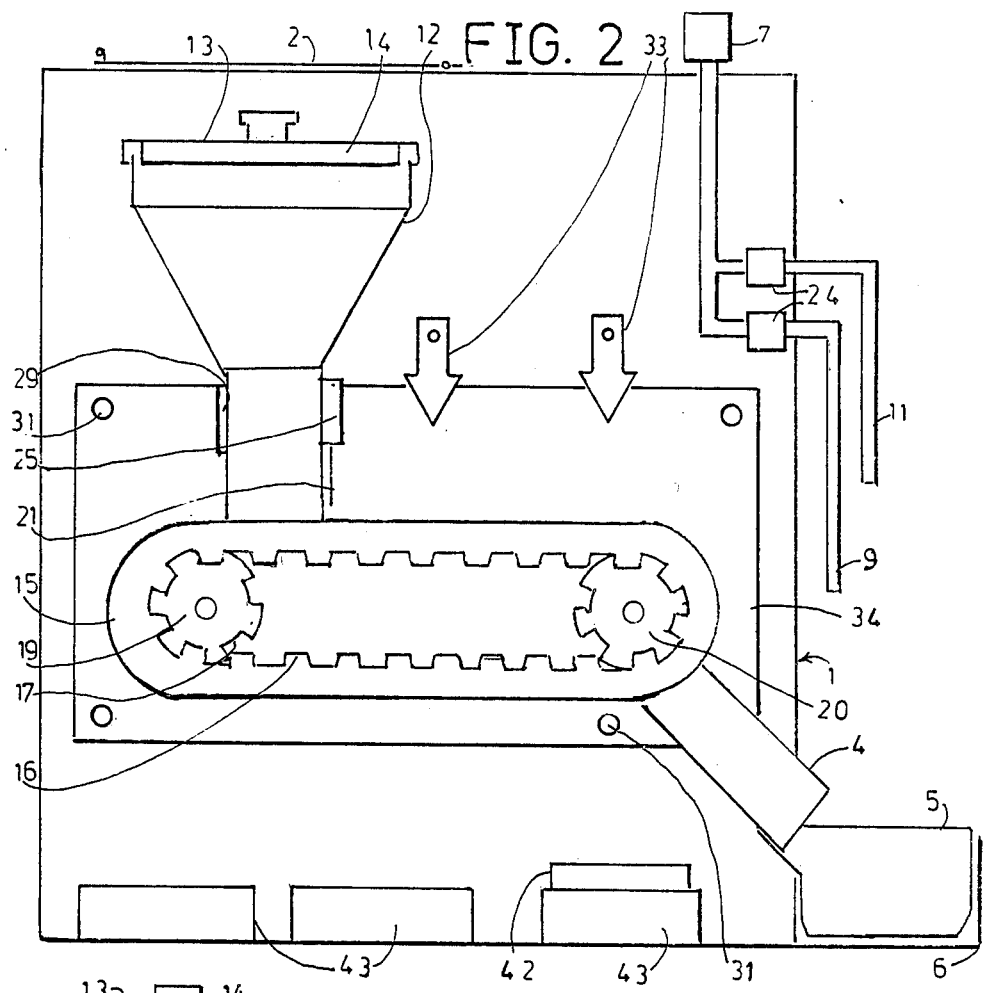
FIG. 2 is a side elevation view of the device with the side cover removed.
Figure 3:
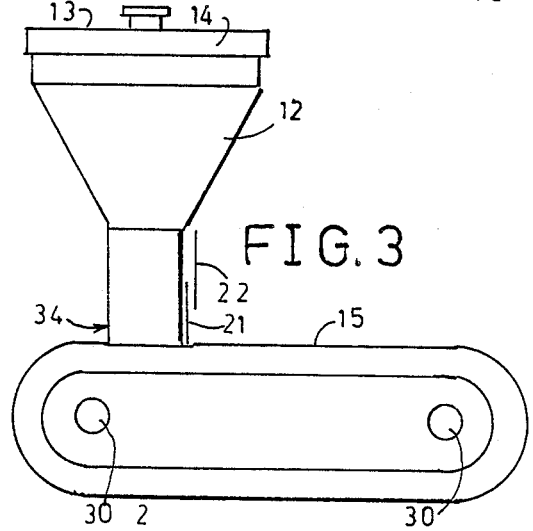
FIG. 3 is a side elevation view, in partial cross section, of the dispensing module.
Figure 7:
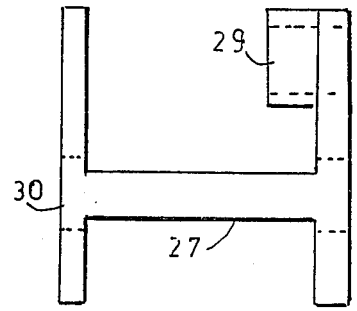
FIG. 7 is a front elevation view of the support of FIG. 5.
Figure 4:
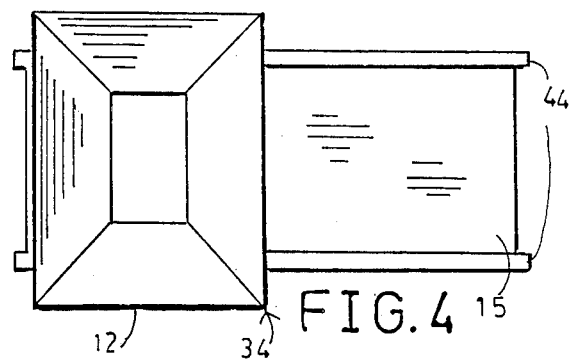
FIG. 4 is a plan view of the dispensing module.
Figure 5:
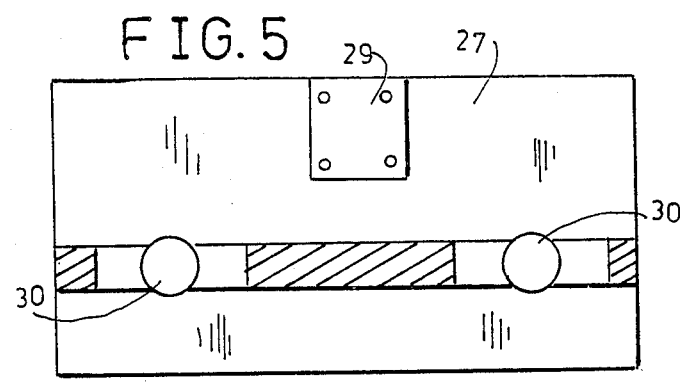
FIG. 5 is a side elevation, in partial section, of the support for the dispensing module.
Figure 6:
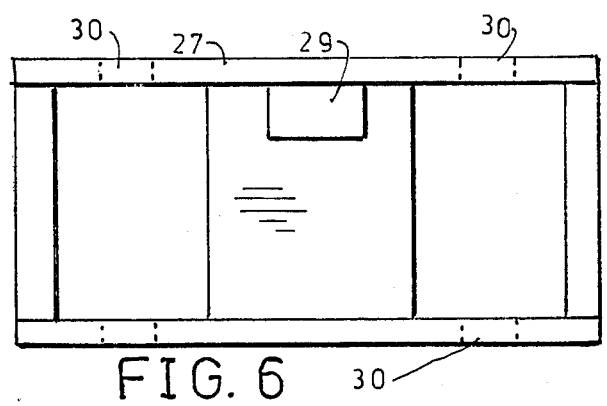
FIG. 6 is a plan view of the support of FIG. 5.
Figure 9:
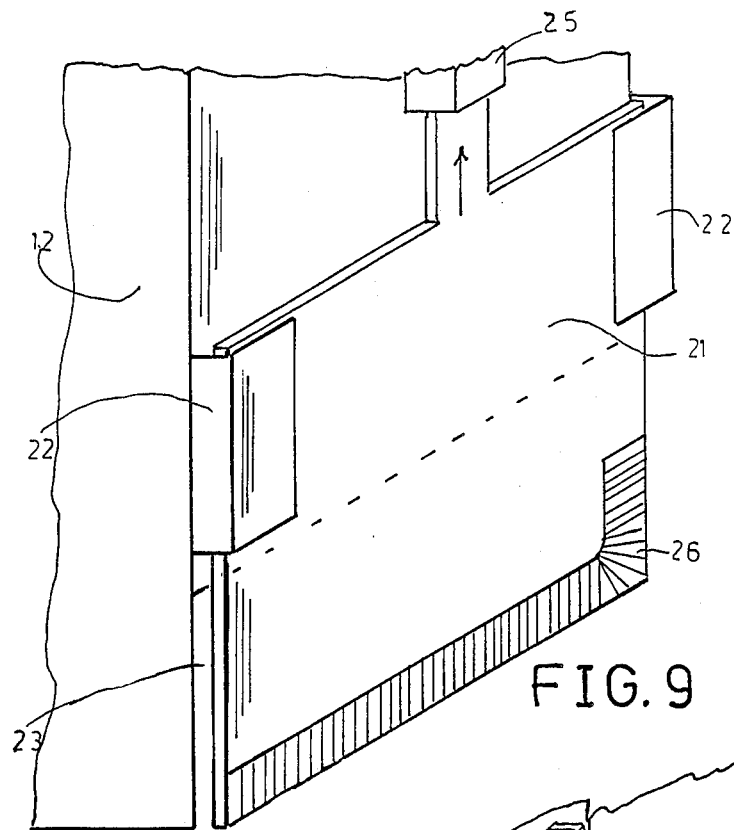
FIG. 9 is a detail perspective view of the gate in closed position.
Figure 10:
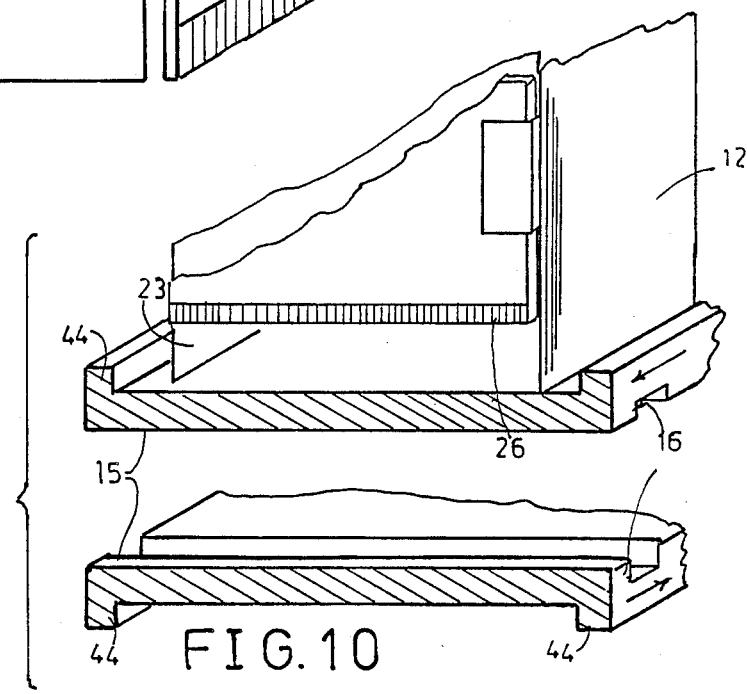
FIG. 10 is a detail perspective view of the conveyor belt and gate in open position.

Adjustable electronic control 28 (FIG. 8) controls solenoid valves 24 controlling water to outlet 9 and 11. It also controls solenoid 25 operating the food gate 21 as well as the conveyor belt drive motor (FIG. 8). The gate 21 may have a resilient border to enhance closing off of the opening 23 in the side of food hopper 12 in the presence of the dry food particles. This is exemplified by the brush border 26 shown in FIGS. 9 and 10.

A modular structure for the machine enhances economical construction and maintenance as well as facilitating decontamination between applications. The moving parts that contact food are mounted together as a removable food subassembly 34 that may be hosed down and/or steam cleaned as shown in FIGS. 2-6. The belt 15, food hopper 12, cover 13, gate 21, and belt gears 19,20 are mounted on an I beam support 27 holding hopper support block 29, and bearings 30 for belt gears 19 and 20. The entire food subassembly is supported on pins 31 fitting into holes 32 on the I beam support 27 and locks in place with detent holders 33.

The electrical subassembly 35 is similarly removable from the machine 1 for maintenance, permitting the washdown of the housing without damage to electrical parts. The electrical subassembly 35 (FIG. 8) includes belt drive motor 36 with belt drive gear engaging means 37 electrical control 28 with adjustable timers 24, food gate solenoid 25 with food gate engaging means 39. Electric line cord 3 may power the unit directly or through battery charger 40 and rechargeable battery 41 as shown here to ensure operation in a power failure. The water solenoids may optionally be replaced by positive displacement pumps feeding from a self contained water reservoir (not shown). Alternatively other self-filling water dish/reservoir systems well known in the art may be employed. The removable weights 42 fit in weight holders 43 to prevent upsetting by large animals, yet facilitating transporting between sites.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. An automatic animal feeding machine for providing food to an animal in a feeding dish in measured amounts at predetermined time intervals without human attendance, comprising:
   a. food hopper means for holding a supply of dry food in a vertical structure for gravity feeding to a lowermost portion with an opening at the bottom, said lowermost portion including a side aperture contiguous with said opening;
   b. gate moving means;
   c. conveyor belt drive means;
   d. movable gate means applied to said side aperture, said gate means movable by said gate moving means between two positions, a first, closed position for closing off said side aperture to prevent the passage of said food therethrough, and a second, open position for permitting the passage of said food through said side aperture;
   e. endless conveyor belt means driven by said conveyor belt drive means arranged below said hopper means so as to close off said opening at said bottom of said hopper means and to carry said food through said side aperture when said gate means is in said second, open position and said belt means is being driven by said belt drive means;
   f. control means connected to said gate moving means and said belt drive means to open said gate for a predetermined time interval and to drive said belt means for a time interval beginning substantially with the opening of said gate and extending beyond the time of closing of said gate for a time sufficient to permit said food carried through said side aperture to fall from said belt means, said control means providing adjustments of said time intervals to adjust portion size and dispensing intervals.
   g. food chute means arranged below said belt means to catch said food as it falls from said belt means when said belt reaches the extent of its linear motion in one direction, said chute means further directing said food into said feeding dish for consumption by said animal.

2. The machine of claim 1, further comprising water dispensing means, said control means further including means controlling said water dispensing means.

3. In the machine of claim 1, said gate means provided with a resilient border to enchance function withou jamming.

4. In the machine of claim 1, said belt means including raised edges for improved retention of food thereupon.

5. In the machine of claim 1, said belt means including a toothed inner surface and said belt drive means including a toothed drive gear for more precise control of motion.

6. The machine of claim 1, further comprising hopper cover means to protect said food from contamination.

7. The hopper cover means of claim 6, including drying means attached to the underside thereof for maintaining the dryness of said food.

8. The machine of claim 1, including removable weights and weight retaining means for stabilizing said machine against disturbance by said animal while enhancing portablility.

9. The machine of claim 1, including rechargeable electric storage means for powering said machine during periods of electric power failure.

10. The machine of claim 1, including water storage and dispensing means that are operational without electric power.

11. The machine of claim 1, further comprising said hopper means, said belt means and said gate means connected as a removable subassembly for cleaning and decontamination between use for different individual animals.

12. The belt means of claim 5, comprised substantially of an elastomeric material.

* * * * *